US007036733B2

(12) United States Patent
Hwang et al.

(10) Patent No.: US 7,036,733 B2
(45) Date of Patent: May 2, 2006

(54) METHOD FOR RESPONDING A READING COMMAND IN AN AUTOMATICALLY ADAPTIVE MEMORY CARD AND MEMORY CARD CONTROLLER

(75) Inventors: Bar-Chung Hwang, Hsinchu (TW); Chung-Chih Chang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 18 days.

(21) Appl. No.: 10/711,541

(22) Filed: Sep. 24, 2004

(65) Prior Publication Data

US 2005/0199732 A1 Sep. 15, 2005

(30) Foreign Application Priority Data

Mar. 12, 2004 (TW) .............................. 93106615 A

(51) Int. Cl.
*G06K 7/08* (2006.01)

(52) U.S. Cl. ...................................................... 235/451

(58) Field of Classification Search ................ 235/451, 235/439, 435, 380, 375, 382, 492, 487, 476
See application file for complete search history.

(56) References Cited

U.S. PATENT DOCUMENTS

| | | | | |
|---|---|---|---|---|
| 6,352,202 | B1 * | 3/2002 | Takiguchi et al. | 235/451 |
| 6,438,638 | B1 * | 8/2002 | Jones et al. | 710/301 |
| 6,820,148 | B1 * | 11/2004 | Cedar et al. | 710/104 |
| 6,910,630 | B1 * | 6/2005 | Schilling | 235/451 |
| 2003/0094491 | A1 * | 5/2003 | Nakabe et al. | 235/451 |

* cited by examiner

*Primary Examiner*—Thien M. Le
*Assistant Examiner*—Edwyn Labaze
(74) *Attorney, Agent, or Firm*—Jiang Chyun IP Office

(57) ABSTRACT

A method for reading an automatically adaptive memory card and a memory card controller are provided. First, whether a present reading address of a reading command is the same as a previous reading address is determined. Next, when the present reading address is determined to be the same as the previous reading address, a response is output and a data is output in a data-lag mode to output the data after the response is outputted. On the other hand, when the present reading address is not the same as the previous reading address, the previous reading address is updated to be the present reading address, the response is output and the data is output in a data-parallel mode to output the data regardless of whether or not the response is outputted. Hence, the memory card with the invention is compatible with several card readers on the market.

14 Claims, 3 Drawing Sheets read the command
S302
whether the commanc is CMD17 ?
S304
No
continues to process such a command
Yes
record the reading address
S306
pcsses CRC7 ?
S308
No
Yes
whether the present reading address is the same as the previous reading address ?
S310
No
update the previous reading address
S312
Yes
S320
output the response
S318
read the data from the memory
S314
output the response
S313
read the data from the memory
output the data
S316
whether the response has been outputted ?
S322
No
Yes
wait for N periods
S324
output the data
S326

METHOD FOR RESPONDING A READING COMMAND IN AN AUTOMATICALLY ADAPTIVE MEMORY CARD AND MEMORY CARD CONTROLLER

CROSS-REFERENCE TO RELATED APPLICATION

This application claims the priority benefit of Taiwan application serial no. 93106615, filed on Mar. 12, 2004, the full disclosure of which is incorporated herein by reference.

BACKGROUND OF THE INVENTION

1. Field of the Invention

This invention generally relates to a memory card, and more particularly to a method for responding a reading command in an automatically adaptive memory card and a memory card controller.

2. Description of Related Art

As the technology advances, the electronic devices have a trend toward a compact size with powerful functions. To achieve this objective, the portable devices such as digital camera, digital camcorder, MP3 player, PDA, or mobile phone use the memory cards as the storage devices. Hence, different types of memory cards with different memory sizes have been developed. The memory cards also have a trend toward a compact size. The most common memory cards on the market include Compact Flash card, Multi-Media card, Secure Digital (SD) card and Smart Media card. As the compact memory cards and the USB interface prevail, they seem to gradually replace the traditional floppy disks and CDs.

FIG. 1A is a traditional timing sequence for reading the data in a SD card. Referring to FIG. 1A, when the card reader sends the reading command via the CMD signal line, the microprocessor in the SD card receives the reading command and sends a response via the CMD signal line. The microprocessor in the SD card will also read the data in the nonvolatile memory of the SD card. When the data being read is ready to be sent out, several periods have passed since the response is sent. At this point the data being read is sent out via the DATA signal line, and the card reader reads the data via the DATA signal line.

FIG. 1B is another traditional timing sequence for reading the data in a SD card. Referring to FIG. 1B, because the SD card may use a high speed microprocessor or an ASIC, it speeds up the reading processing speed. Hence, when the microprocessor in the SD card receives the reading command and sends a response via the CMD signal line, the data being read is also ready to be sent out. I.e., the data being read is sent out via the DATA signal line before the response is complete. If the card reader has a sufficient high speed, it can read the data via the DATA signal line immediately to enhance the reading efficiency. Unfortunately, some existing card readers cannot read the data via the DATA signal line immediately when processing the response from the SD card. Hence, the reading error may occur. It causes the compatibility between the card reader and the SD card.

SUMMARY OF THE INVENTION

Accordingly, the present invention is directed to a method for responding a reading command in an automatically adaptive memory card in order to be compatible with the card readers with a lower processing speed; when connected to the card readers with a high processing speed, it can also enhance the reading efficiency.

The present invention is also directed to a memory card controller for an automatically adaptive memory card so that the memory card with such a memory card controller is compatible with different card readers and provides reading efficiency.

The method for responding a reading command in an automatically adaptive memory card according to an embodiment of the present invention, whether a present reading address of the reading command is same as a previous reading address is determined; when the present reading address is determined to be the same as the previous reading address, a response is output; and a data is output in a data-lag mode to output the data after the response is outputted; and if the present reading address is not the same as the previous reading address, the previous reading address is updated to be the present reading address; the response is output; and the data is output in a data-parallel mode to output the data regardless of whether or not the response is outputted. The step of outputting the data in a data-lag mode includes outputting the data after the response is outputted and after a first predetermined time passes.

In an embodiment of the present invention, when the data is outputted in the data-lag mode, the data in the data-lag mode is output during a second predetermined time without determining whether the present reading address of the reading command is the same as the previous reading address; when it has been determined for a plurality of times that the present reading address of the reading command is the same as the previous reading address, the data in the data-lag mode is always output without determining whether the present reading address of the reading command is the same as the previous reading address.

In an embodiment of the present invention, whether the reading command passes a cyclic redundancy check also need to be is determined, the reading command will stop being processed if the reading command does not pass a cyclic redundancy check. Further, the data is read based on the reading command from a memory of the memory card during the step of outputting the response.

In an embodiment of the present invention, the memory card is a SD memory card. When the reading command is a multi-block reading command, the method further comprises a step of continuously outputting a data in a next block of the data after outputting the data; and stopping the step of outputting the data when the memory card receives a stop command.

In an embodiment of the present invention, after the memory card receives the reading command, the response is output in advance and then determines whether the present reading address of a reading command is the same as the previous reading address.

The present invention is directed to a memory card controller for an automatically adaptive memory card. According to an embodiment of the present invention, a memory card is connected to a card reader. The card reader sends a reading command to read a data from a memory of the memory card. When the memory card controller receives the reading command, whether the present reading address is the same as a previous reading address is determined; when the present reading address is determined to be the same as the previous reading address, a response is output and the data is output after the response is outputted; and when the present reading address is determined to be not the same as the previous reading address, the previous reading address is updated to be the present reading address, the response is output, and the data is output regardless of whether or not the response is outputted.

In consideration of the fact that the low speed card reader will repeatedly send the reading command for the same address when the low speed card reader cannot process the response and the data at the same time to cause a reading error. This fact will determine reading of the data is in the data-lag mode or in the data-parallel mode, the present inventors developed a method for responding a reading command in an automatically adaptive memory card and the memory card controller for complying with not only the low speed card reader but also the high speed card reader to enhance the reading efficiency.

The above is a brief description of some deficiencies in the prior art and advantages of the present invention. Other features, advantages and embodiments of the invention will be apparent to those skilled in the art from the following description, accompanying drawings and appended claims. In the figures, when the device is "connected" or "coupled" to another device, it can be directly or indirectly connected or coupled to another device; when the device is "directly connected" or "directly coupled" to another device, there is no device between the devices connected or coupled with each other.

DESCRIPTION OF THE EMBODIMENTS

Figure 1A:
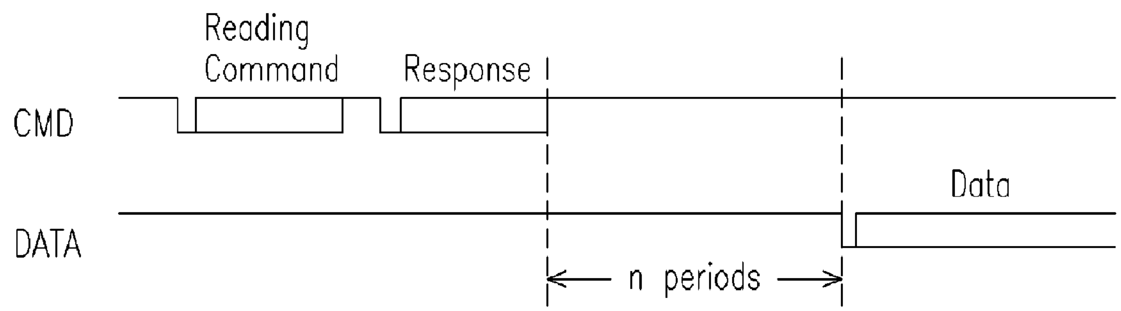
FIG. 1A is a traditional timing sequence for reading the data in the SD card.
Figure 1B:
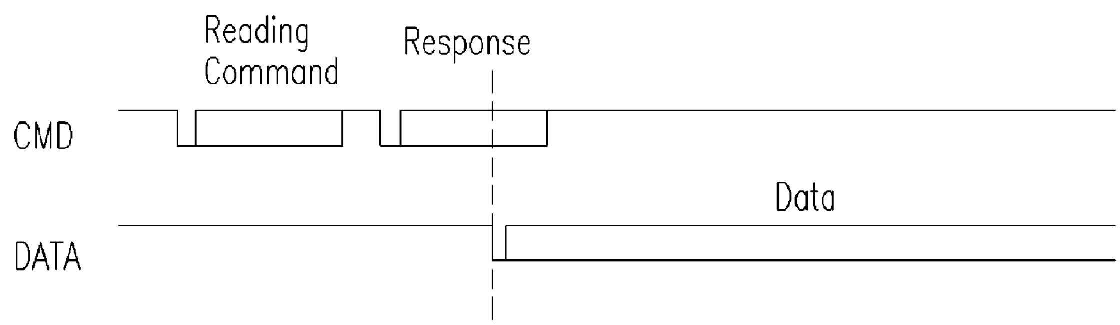
FIG. 1B is another traditional timing sequence for reading the data in the SD card.

FIGS. 1A and 1B illustrate two responding modes for the memory card controller in the SD card to read the data—the data-lag mode and data-parallel mode. The data-lag mode means, outputting the data via the DATA signal line after the response via the CMD signal line has been outputted and after a first predetermined time, such as N periods, has passed. The data-parallel mode means, outputting the data when the data is ready, regardless of whether or not the response is outputted. Although the data-parallel mode provides a better performance, the memory card with data-parallel mode may not be compatible with some card readers.

First, method for responding a reading command in an automatically adaptive memory card of the present invention is illustrated. First, the memory card controller determines whether or not a present reading address of a received reading command is the same as a previous reading address. If the present reading address is the same as the previous reading address, it means the card reader cannot correctly receive the previous data. Hence, the memory card controller outputs a response and outputs a data in the data-lag mode to output the data after the response has been outputted and after a first predetermined time, such as N periods of time, has passed. If the present reading address is not the same as the previous reading address, the memory card controller updates the previous reading address to be the present reading address that can be used in the subsequent determination step. Then the memory card controller outputs the response and outputs the data in a data-parallel mode, to output the data regardless of whether or not the response is outputted.

When outputting the data in a data-lag mode, the memory card controller outputs the data after the response has been outputted and N periods of time have passed. However, one skilled in the art can understand that N periods of time are not necessarily preset and that the data can be immediately output after the response has been outputted.

The method, according to an embodiment of the present invention, can determine whether the card reader can process the response and the data at the same time by determining for a plurality of times that the present reading address of the reading command is the same as the previous reading address. I.e., the card reader is not compatible with the memory card because it is determined for a plurality of times that the present reading address of the reading command is the same as the previous reading address so that the card reader cannot obtain the correct data and sends the reading command with the same reading address. Hence, it is determined that the card reader is not compatible with the memory card; the memory card controller will not waste time to determine again whether the present reading address of the reading command is the same as the previous reading address, and thereafter outputs the data in the data-lag mode without determining whether or not the present reading address is the same as the previous reading address.

The method, according to an embodiment of the present invention, can also determine to output the data in the data-lag mode directly during a predetermined time after reading and outputting the data in the data-lag mode without determining whether or not the present reading address is the same as the previous reading address. Because generally the card reader will not change its operation mode in a short time. Hence, there is no need, after a predetermined time, to determine whether or not the present reading address is the same as the previous reading address.

Because the memory card controller has to output a response regardless of whether or not to output the data in the data-lag mode or in the data-parallel mode, therefore in an alternative embodiment, when the memory card controller receives the reading command, the memory card controller can output the response first and then determine whether or not the present reading address of a reading command is the same as the previous reading address.

Figure 2:
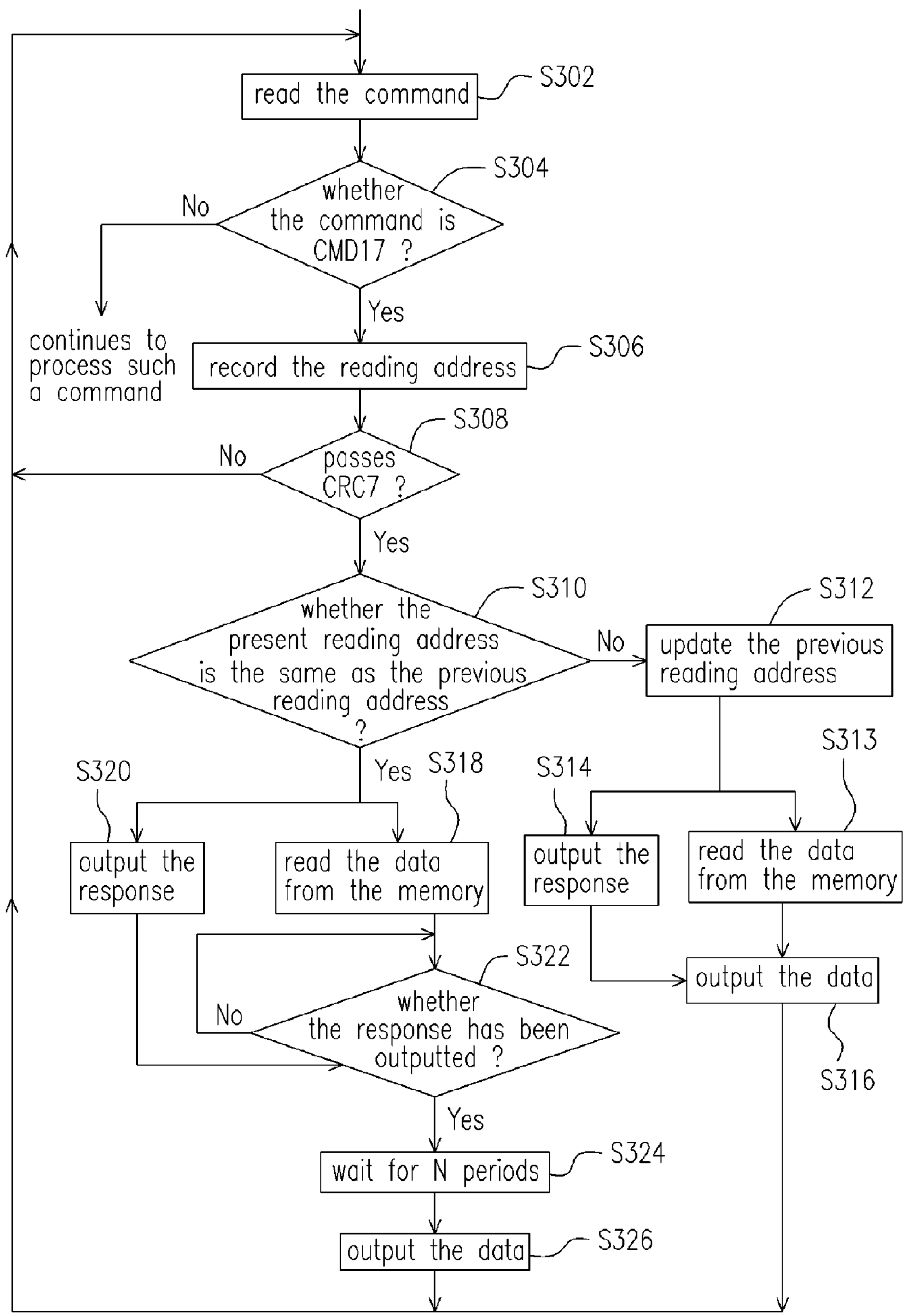
FIG. 2 is a flow chart illustrating a method for the SD card responding the command CMD17 in accordance with an embodiment of the present invention.

FIG. 2 is a flow chart for the SD card responding the command CMD17 in accordance with an embodiment of the present invention. The memory card controller in the SD card receives the command on the CMD signal line from the card reader (S302). The memory card controller determines whether the command is CMD17, i.e., the reading command (S304). If not, the memory card controller continues to process such a command. If the command is determined to be the reading command, the memory card controller will record the reading address of the present reading command (S306). Then it determines whether the reading command can pass the cyclic redundancy check (S308). The cyclic redundancy check is a method to check the data accuracy. If the reading command cannot pass the cyclic redundancy check, it means that the received command is not correct. If so, the memory card controller will discard the received command and receive the command once again (go back to S302).

If the reading command passes the cyclic redundancy check, the memory card controller will determine whether or not the present reading address of the reading command is the same as the previous reading address (S310). If it is determined to be the same, it means that the card reader cannot receive the previous data. Then the steps S318 and S320 will be performed. Otherwise, the step S312 will be performed.

In step S320, the memory card controller will output the response. At the same time the memory card controller will also read the data corresponding the reading address from the nonvolatile memory in the SD card (S318). The memory card controller then determines whether the response has been outputted (S322). If the response has not been outputted, the memory card controller will wait until it has been outputted. If the response has been outputted, the memory card controller will wait for N periods of time (S324) to output the data (S326).

In step S312, because the reading addresses are different, the memory card controller has to update the reading address to be the present reading address that can be used in the subsequent determination step. The memory card controller then outputs the response (S314). At the same time, the memory card controller reads the data corresponding to the reading address from the nonvolatile memory of the SD card (S313). The memory card controller outputs the data in the data-parallel mode, to output the data regardless of whether or not the response has been outputted (S316).

Figure 3:
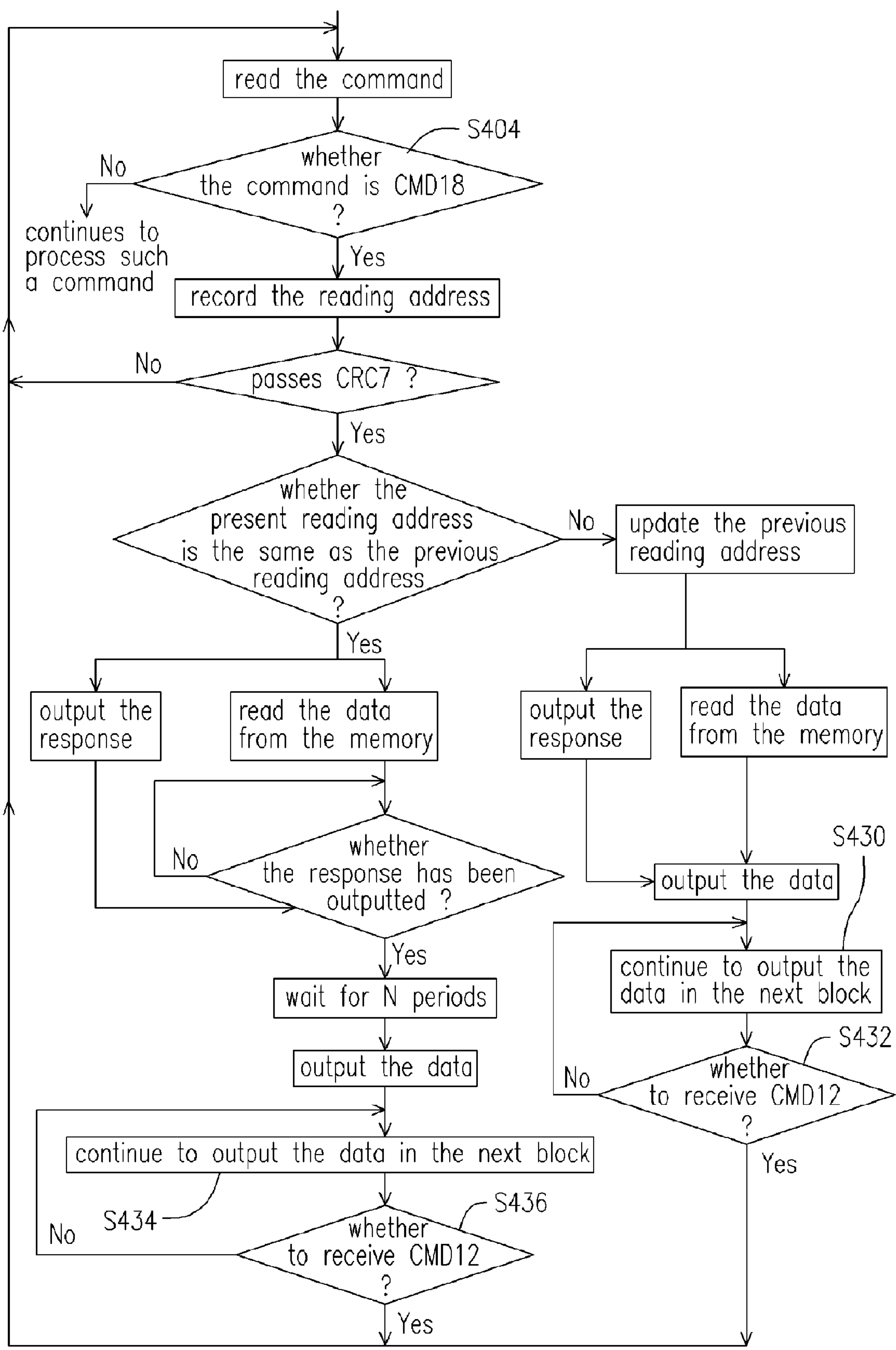
FIG. 3 is a flow chart illustrating a method for the SD card responding the command CMD18 in accordance with an embodiment of the present invention.

FIG. 3 is a flow chart for the SD card responding the command CMD18 in accordance with an embodiment of the present invention. FIG. 3 is very similar to FIG. 2. In this embodiment, unlike the embodiment of FIG. 2, the memory card controller determines whether the command is CMD18, i.e., the multi-block reading command (S404). If so, the steps S430 and S432, or S434 and S436 will be performed after the data in the first block is outputted. In the steps of S430 or S434, the memory card controller will continue to output the data in the next block. In steps S432 and S436, when the memory card receives the CMD12, i.e., the stop command, it will stop outputting the data.

The present invention is also directed to a memory card controller for an automatically adaptive memory card. According to an embodiment of the present invention, a memory card is connected to a card reader. The card reader sends a reading command to read a data from a memory of the memory card. When the memory card controller receives the reading command, whether a present reading address is the same as a previous reading address is determined. When the present reading address is determined to be the same as the previous reading address, a response is output and the data is output after the response is outputted. On the other hand, when the present reading address is determined to be not the same as the previous reading address, the previous reading address is updated to be the present reading address, the response is output, and the data is output regardless of whether or not the response is outputted.

The present invention is also directed to a method for responding a reading command in an automatically adaptive memory card and memory card controller therefor. In consideration of the fact that the low speed card reader will repeatedly send the reading command for the same address when the low speed card reader cannot process the response and the data at the same time to cause a reading error. The fact will determine reading of the data is in the data-lag mode or in the parallel mode. If the reading commend will not be repeatedly sent out for the same address, that is, the card reader can process the response and the data at the same time, it is determined that reading of the data is in the parallel mode, in order to enhance the reading efficiency. Therefore, the present invention developed a method for responding a reading command in an automatically adaptive memory card and the memory card controller for complying with not only the low speed card reader but also the high speed card reader to enhance the reading efficiency.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A method for responding a reading command in an automatically adaptive memory card, comprising:

determining whether a present reading address of the reading command is same as a previous reading address;

wherein when said present reading address is same as said previous reading address, outputting a response and outputting a data in a data-lag mode to output said data after said response is outputted; and wherein when said present reading address is not same as said previous reading address, updating said previous reading address to be said present reading address, outputting said response and said data in a data-parallel mode to output said data regardless of whether said response is outputted.

2. The method of claim 1, wherein said step of outputting said data in a data-lag mode includes outputting said data after maid response is outputted and after a first predetermined time passes.

3. The method of claim 2, further comprising a step of outputting said data in said data-lag mode during a second predetermined time, without determining whether said present reading address of said reading command is the same as said previous reading address after said data is outputted in said data-lag mode.

4. The method of claim 3, further comprising a step of outputting said data in said data-lag mode without determining whether or not said present reading address of said reading command is the same as said previous reading address when it has determined for a plurality of times that said present reading address of said reading command is the same as said previous reading address.

5. The method of claim 1, is further comprising:

determining whether said reading command passes a cyclic redundancy check; and stopping a step of processing said reading command when said reading command does not pass a cyclic redundancy check.

6. The method of claim 1, further comprising a step of reading said data based on said reading command from a memory of said memory card during said step of outputting said response.

7. The method of claim 1, wherein when said reading command is a multi-block reading command, further comprising:

outputting a data in a next block of said data after outputting said data; and stop outputting said data when said memory card receives a atop command.

8. The method of claim 1, wherein said memory card is a SD memory card.

9. A method for responding a reading command in an automatically adaptive memory card, comprising:

outputting a response, wherein when a present reading address of a reading command is same as a previous reading address, a data is output in a data-lag mode to output said data after said response is outputted; and when said present reading address is not same as said previous reading address, said previous reading address is updated to be said present reading address and said data is output in a data-parallel mode to output said data regardless of whether said response is outputted.

10. The method of claim 9, further comprising: determining whether said reading command passes a cyclic redundancy check, wherein when said reading command does not pass the cyclic redundancy check, processing of said reading command is stopped.

11. The method of claim 9, further comprising a step of reading said data based on said reading command from a memory of said memory card.

12. The method of claim 9, wherein when said reading command is a multi-block reading command, further comprising:

outputting a data in a next block of said data after outputting said data and stop outputting said data when said memory card receives a atop command.

13. The method of claim 9, wherein said memory card is a SD memory card.

14. A memory card controller for an automatically adaptive memory card, said memory card being connected to a card reader, said card reader sending a reading command to read a data from a memory of said memory card; said memory card controller characterizing: when said memory card controller receives said reading command, determining whether a present reading address is the same as a previous reading address; when said present reading address is the same as said previous reading address, outputting a response and outputting said data after said response is outputted; and when said present reading address is not the same as said previous reading address, updating said previous reading address to be said present reading address, outputting said response, and outputting said data regardless of whether or not said response is outputted.

* * * * *